Nov. 16, 1937.  M. C. SCHWAB  2,099,083
VALVE FOR LIQUID FLOW APPARATUS
Original Filed Nov. 17, 1933   2 Sheets-Sheet 1

INVENTOR
MARTIN C. SCHWAB
BY James R. McKnight
ATTORNEY

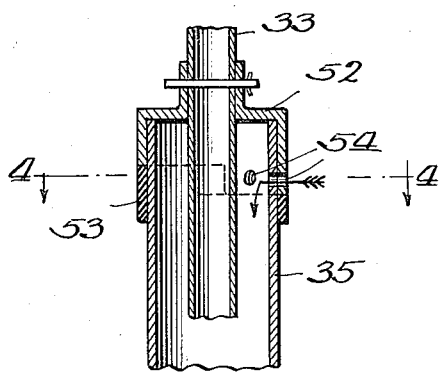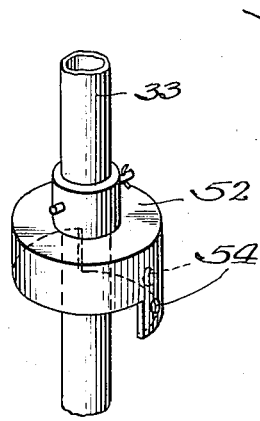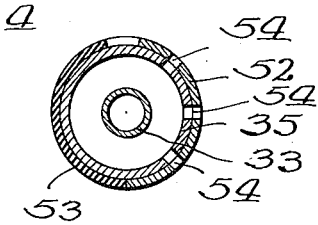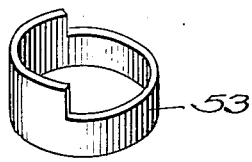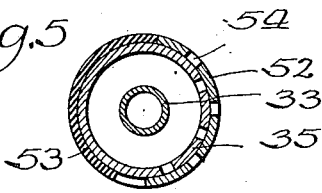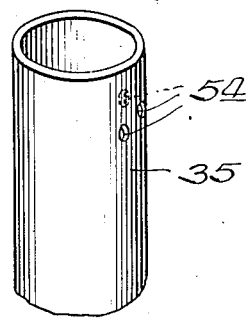

Patented Nov. 16, 1937

2,099,083

UNITED STATES PATENT OFFICE 2,099,083

VALVE FOR LIQUID FLOW APPARATUS

Martin C. Schwab, Chicago, Ill.

Original application November 17, 1933, Serial No. 698,544. Divided and this application May 17, 1935, Serial No. 22,063

3 Claims. (Cl. 221—67)

This is a divisional application from the original filed on November 17, 1933, Serial No. 698,544 for Liquid flow apparatus which issued August 6th, 1935, as Patent No. 2,010,417.

My invention relates to a valve structure for liquid flow apparatus.

Referring to the drawings: Fig. 1 is a front elevational view of a container to which my valve structure is attached and Figs. 2 and 3 are a detailed view of my valve structure in position.

Figure 4 is a horizontal section taken along the line 4—4 of Figure 3 and looking in the direction of the arrows, showing the holes 54 in operative register.

Figure 5 is a similar horizontal section showing the holes 54 out of operative register.

Figure 6 is an extended perspective view of the portion shown in Figure 3 to more clearly show the construction and operation of the device.

Figure 1:
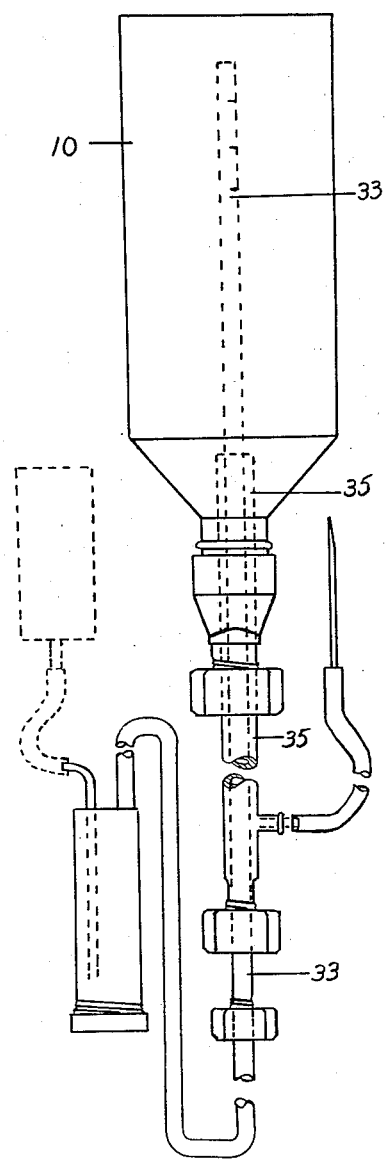
Figure 2:
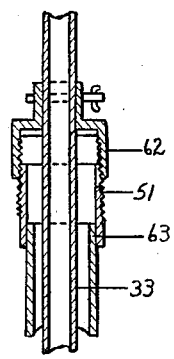

My invention more in detail comprises a container 10 containing liquid. Into container 10 extends an air inlet tube 33 surrounded by liquid flow tube 35. As shown in Fig. 2 a screw threaded upper ferrule 62 is fixed to the air inlet tube 33. Below said upper ferrule 62 screw threaded lower ferrule 63 is attached to said liquid flow tube 35 so as to leave the opening 51 for the admission of liquid from the container 10 into liquid flow tube 35. When it is desired to close this opening 51 either air inlet tube 33 or liquid flow tube 35 may be rotated until the opening 51 is closed and liquid flow tube 35 is sealed so as to prevent the admission of liquid thereinto.

A different embodiment shown in Fig. 3 comprises a valve structure in which the upper ferrule 52 of the valve is fixed to the air inlet tube 33 and the lower ferrule 53 of the valve is secured to the liquid flow tube 35, the portions 52 and 53 being separated from each other along the offset, shown in dotted lines. The upper ferrule 52 and the liquid flow tube 35 have a plurality of holes 54. When it is desired that the structure operate the air inlet tube 33 is rotated until the holes 54 in the upper ferrule 52 and the liquid flow tube 35 are opposite each other. It is apparent that both of my valve structures are operable from without the container and that they may be closed or opened without ever disturbing the liquid within.

While I have shown herein preferred embodiments of my invention yet I wish it understood that the same are susceptible of modification and change without departing from the spirit of my invention.

Having thus described my invention I claim:

1. Liquid flow apparatus comprising a container, a dispensing member, a liquid flow tube leading from within the container to the dispensing member, an air inlet tube within said liquid flow tube, ferrules having openings attached to each of said tubes, one of said ferrules movable within the other of said ferrules so that the openings may be covered or exposed by manipulation of the air inlet tube for controlling the liquid to be dispensed.

2. Liquid flow apparatus comprising a container, a dispensing member, a liquid flow tube leading from within the container to the dispensing member, an air inlet tube within said liquid flow tube, an upper ferrule attached to the air inlet tube, a lower ferrule attached to the liquid flow tube, said ferrules having holes and adapted upon movement of the air inlet tube to move within each other so that the openings may be covered or exposed thereby controlling the flow of liquid from the container.

3. In combination with a container for liquid to be dispensed, a dispensing member, a liquid flow tube leading from the container to the dispensing member, an air inlet tube within said liquid flow tube, an upper ferrule attached to the air inlet tube, a lower ferrule attached to the liquid flow tube, said ferrules being so adapted that upon relative movement of the liquid flow tube and the vent tube from the outside of the container, the flow of liquid from the container may be controlled.

MARTIN C. SCHWAB.